(12) United States Patent
Yasura

(10) Patent No.: US 11,335,356 B2
(45) Date of Patent: May 17, 2022

(54) DIGITAL AUDIO PROCESSING DEVICE, DIGITAL AUDIO PROCESSING METHOD, AND DIGITAL AUDIO PROCESSING PROGRAM

(71) Applicant: JVCKENWOOD Corporation, Yokohama (JP)

(72) Inventor: Sadahiro Yasura, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 223 days.

(21) Appl. No.: 16/868,353

(22) Filed: May 6, 2020

(65) Prior Publication Data

US 2020/0265861 A1 Aug. 20, 2020

Related U.S. Application Data

(63) Continuation of application No. PCT/JP2018/040028, filed on Oct. 29, 2018.

(51) Int. Cl.
*G10L 21/0332* (2013.01)
*G06F 7/22* (2006.01)
(Continued)

(52) U.S. Cl.
CPC .......... *G10L 21/0332* (2013.01); *G06F 7/22* (2013.01); *G06F 7/50* (2013.01); *G06F 7/523* (2013.01); *G10L 25/00* (2013.01)

(58) Field of Classification Search
CPC ... G10L 21/0332; G10L 21/00; G10L 21/003; G10L 21/22; G10L 21/0316–0364;
(Continued)

(56) References Cited

U.S. PATENT DOCUMENTS

| 6,449,519 B1* | 9/2002 | Kuwaoka | G11B 20/10 |
| | | | 381/61 |
| 2008/0082189 A1* | 4/2008 | Kuwaoka | G10L 19/26 |
| | | | 700/94 |

(Continued)

FOREIGN PATENT DOCUMENTS

JP H11126097 A 5/1999

*Primary Examiner* — Qi Han
(74) *Attorney, Agent, or Firm* — Nath, Goldberg & Meyer; Jerald L. Meyer

(57) ABSTRACT

A local extremum calculator detects a local maximum sample and a local minimum sample of a digital audio signal. A number-of-sample detector detects a sample interval between the local maximum sample and the local minimum sample. A difference value calculator calculates difference values between adjacent samples. A correction value calculator calculates a first correction value by multiplying the difference value between the local maximum sample and a first adjacent sample by a coefficient and calculates a second correction value by multiplying the difference value between the local minimum sample and a second adjacent sample by the coefficient. When a periodic signal detector detects that the digital audio signal is a single sine wave, an adder/subtractor does not add the first correction value to the first adjacent sample, and does not subtract the second correction value from the second adjacent sample.

5 Claims, 11 Drawing Sheets

(51) Int. Cl.
*G06F 7/50* (2006.01)
*G06F 7/523* (2006.01)
*G10L 25/00* (2013.01)

(58) Field of Classification Search
CPC ......... G10L 25/00; G10L 25/60; G10L 25/78; G10L 25/90
USPC .................. 704/500, 503, 200, 225, 229
See application file for complete search history.

(56) References Cited

U.S. PATENT DOCUMENTS

2010/0010650 A1* 1/2010 Ooue ............... G11B 20/10527
700/94
2015/0065813 A1* 3/2015 Wochlik ................. A61B 5/398
600/301

* cited by examiner

FIG. 3

| LOCAL MAXIMUM-MINIMUM SAMPLE INTERVAL | LEVEL SELECTION SIGNAL | CORRECTION VALUE |
|---|---|---|
| 2 SAMPLES | 00 | 1/2 OF DIFFERENCE BETWEEN ADJACENT SAMPLE |
| 2 SAMPLES | 01 | 1/4 OF DIFFERENCE BETWEEN ADJACENT SAMPLE |
| 2 SAMPLES | 10 | 1/8 OF DIFFERENCE BETWEEN ADJACENT SAMPLE |
| 2 SAMPLES | 11 | 1/16 OF DIFFERENCE BETWEEN ADJACENT SAMPLE |
| 3 SAMPLES | 00 | 1/2 OF DIFFERENCE BETWEEN ADJACENT SAMPLE |
| 3 SAMPLES | 01 | 1/4 OF DIFFERENCE BETWEEN ADJACENT SAMPLE |
| 3 SAMPLES | 10 | 1/8 OF DIFFERENCE BETWEEN ADJACENT SAMPLE |
| 3 SAMPLES | 11 | 1/16 OF DIFFERENCE BETWEEN ADJACENT SAMPLE |
| 4 SAMPLES | 00 | 1/4 OF DIFFERENCE BETWEEN ADJACENT SAMPLE |
| 4 SAMPLES | 01 | 1/8 OF DIFFERENCE BETWEEN ADJACENT SAMPLE |
| 4 SAMPLES | 10 | 1/16 OF DIFFERENCE BETWEEN ADJACENT SAMPLE |
| 4 SAMPLES | 11 | 1/32 OF DIFFERENCE BETWEEN ADJACENT SAMPLE |
| 5 SAMPLES | 00 | 1/4 OF DIFFERENCE BETWEEN ADJACENT SAMPLE |
| 5 SAMPLES | 01 | 1/8 OF DIFFERENCE BETWEEN ADJACENT SAMPLE |
| 5 SAMPLES | 10 | 1/16 OF DIFFERENCE BETWEEN ADJACENT SAMPLE |
| 5 SAMPLES | 11 | 1/32 OF DIFFERENCE BETWEEN ADJACENT SAMPLE |
| 6 SAMPLES | 00 | 1/8 OF DIFFERENCE BETWEEN ADJACENT SAMPLE |
| 6 SAMPLES | 01 | 1/16 OF DIFFERENCE BETWEEN ADJACENT SAMPLE |
| 6 SAMPLES | 10 | 1/32 OF DIFFERENCE BETWEEN ADJACENT SAMPLE |
| 6 SAMPLES | 11 | 1/64 OF DIFFERENCE BETWEEN ADJACENT SAMPLE |
| 7 SAMPLES | 00 | 1/8 OF DIFFERENCE BETWEEN ADJACENT SAMPLE |
| 7 SAMPLES | 01 | 1/16 OF DIFFERENCE BETWEEN ADJACENT SAMPLE |
| 7 SAMPLES | 10 | 1/32 OF DIFFERENCE BETWEEN ADJACENT SAMPLE |
| 7 SAMPLES | 11 | 1/64 OF DIFFERENCE BETWEEN ADJACENT SAMPLE |
| 8 SAMPLES | 00 | 1/16 OF DIFFERENCE BETWEEN ADJACENT SAMPLE |
| 8 SAMPLES | 01 | 1/32 OF DIFFERENCE BETWEEN ADJACENT SAMPLE |
| 8 SAMPLES | 10 | 1/64 OF DIFFERENCE BETWEEN ADJACENT SAMPLE |
| 8 SAMPLES | 11 | 1/128 OF DIFFERENCE BETWEEN ADJACENT SAMPLE |

DIGITAL AUDIO PROCESSING DEVICE, DIGITAL AUDIO PROCESSING METHOD, AND DIGITAL AUDIO PROCESSING PROGRAM

CROSS REFERENCE TO RELATED APPLICATION

This application is a Continuation of PCT Application No. PCT/JP2018/040028, filed on Oct. 29, 2018, and claims the priority of Japanese Patent Application No. 2017-214286, filed on Nov. 7, 2017, the entire contents of both of which are incorporated herein by reference.

BACKGROUND

The present disclosure relates to a digital audio processing device, a digital audio processing method, and a digital audio processing program to process digital audio signals.

Japanese Patent No. 3401171 (Patent Literature 1) describes a digital audio processing device which improves the sound quality by processing a digital audio signal as follows. The digital audio processing device detects the number of samples between a local maximum sample having a local maximum of the waveform of a digital audio signal and a local minimum sample having a local minimum. The digital audio processing device adds to a sample adjacent to the local maximum sample, a correction value obtained by multiplying the difference value between the local maximum sample and the next sample by a coefficient of less than 1. The digital audio processing device subtracts from a sample adjacent to the local minimum sample, a correction value obtained by multiplying the difference value between the local minimum sample and the adjacent sample by a coefficient of less than 1.

SUMMARY

The digital audio processing device described in Patent Literature 1 involves a problem that processing a digital audio signal of a single sine wave sometimes lowers the sound quality. For example, when sound sources of digital audio signals are synthesizers, the digital audio signals are sometimes periodic signals of single sine waves. Audio signals generated by playing a single instrument are sometimes periodic signals near single sine waves. When such a periodic signal is processed with the digital audio processing device described in Patent Literature 1, some overtones of a single sine wave as the fundamental are added to the digital audio signal, sometimes degrading the sound quality.

A first aspect of one or more embodiments provides a digital audio processing device including: a local extremum calculator configured to calculate a local maximum and a local minimum in samples constituting an inputted digital audio signal, and to detect a local maximum sample including the local maximum and a local minimum sample including the local minimum; a number-of-sample detector configured to detect a sample interval between the local maximum sample and the local minimum sample adjacent to each other; a difference value calculator configured to calculate difference values between adjacent samples of the digital audio signal; a correction value calculator configured, when the sample interval detected by the number-of-sample detector is within a range from a predetermined minimum value to a predetermined maximum value, to calculate a first correction value by multiplying the difference value between the local maximum sample and a first adjacent sample, which is adjacent to the local maximum sample, by a predetermined coefficient, and to calculate a second correction value by multiplying the difference value between the local minimum sample and a second adjacent sample, which is adjacent to the local minimum sample, by the predetermined coefficient, the difference values being calculated by the difference value calculator; an adder/subtractor configured to add the first correction value to the first adjacent sample and to subtract the second correction value from the second adjacent sample; and a periodic signal detector configured to detect whether the digital audio signal is a periodic signal of a single sine wave, at least based on a first difference between a latest sample interval detected by the number-of-sample detector and a sample interval which precedes the latest sample interval by two sample intervals, wherein the digital audio processing device is configured not to add the first correction value to the first adjacent sample and not to subtract the second correction value from the second adjacent sample when the periodic signal detector detects that the digital audio signal is a periodic signal of a single sine wave.

A second aspect of one or more embodiments provides a digital audio processing method including: calculating a local maximum and a local minimum in samples constituting an inputted digital audio signal and detecting a local maximum sample including the local maximum and a local minimum sample including the local minimum; detecting a sample interval between the local maximum sample and the local minimum sample adjacent to each other; calculating difference values between adjacent samples of the digital audio signal; detecting whether the digital audio signal is a periodic signal of a single sine wave, at least based on a difference between a latest sample interval and a sample interval which precedes the latest sample interval by two sample intervals; when it is detected that the digital audio signal is not a periodic signal of a single sine wave and the detected sample interval is within a range from a predetermined minimum value to a predetermined maximum value, calculating a first correction value by multiplying the difference value between the local maximum sample and a first adjacent sample, which is adjacent to the local maximum sample, by a predetermined coefficient and calculating a second correction value by multiplying the difference value between the local minimum sample and a second adjacent sample, which is adjacent to the local minimum sample, by the predetermined coefficient; adding the first correction value to the first adjacent sample and subtracting the second correction value from the second adjacent sample to correct the digital audio signal and output the corrected digital audio signal; and when it is detected that the digital audio signal is a periodic signal of a single sine wave, outputting the digital audio signal without correcting the digital audio signal by not adding the first correction value to the first adjacent sample and not subtracting the second correction value from the second adjacent sample.

A third aspect of one or more embodiments provides a digital audio processing program stored in a non-transitory storage medium causing a computer to execute the steps of: a step of calculating a local maximum and a local minimum in samples constituting an inputted digital audio signal and detecting a local maximum sample including the local maximum and a local minimum sample including the local minimum; a step of detecting a sample interval between the local maximum sample and the local minimum sample adjacent to each other; a step of calculating difference values between adjacent samples of the digital audio signal; a step of detecting whether the digital audio signal is a periodic signal of a single sine wave, at least based on a difference between a latest sample interval and a sample interval which precedes the latest sample interval by two sample intervals; when it is detected that the digital audio signal is not a periodic signal of a single sine wave and the detected sample interval is within a range from a predetermined minimum value to a predetermined maximum value, a step of calculating a first correction value by multiplying the difference value between the local maximum sample and a first adjacent sample, which is adjacent to the local maximum sample, by a predetermined coefficient and calculating a second correction value by multiplying the difference value between the local minimum sample and a second adjacent sample, which is adjacent to the local minimum sample, by the predetermined coefficient; a step of adding the first correction value to the first adjacent sample and subtracting the second correction value from the second adjacent sample to correct the digital audio signal and output the corrected digital audio signal; and when it is detected that the digital audio signal is a periodic signal of a single sine wave, a step of outputting the digital audio signal without correcting the digital audio signal by not adding the first correction value to the first adjacent sample and not subtracting the second correction value from the second adjacent sample.

BRIEF DESCRIPTION OF THE DRAWINGS

FIG. 3 is a diagram illustrating a table example of correction values set for sample intervals between the local maximum sample and the local minimum sample.

DETAILED DESCRIPTION

The following describes a digital audio processing device, a digital audio processing method, and a digital audio processing program according to each embodiment with reference to the accompanying drawings.

First Embodiment

Figure 1:
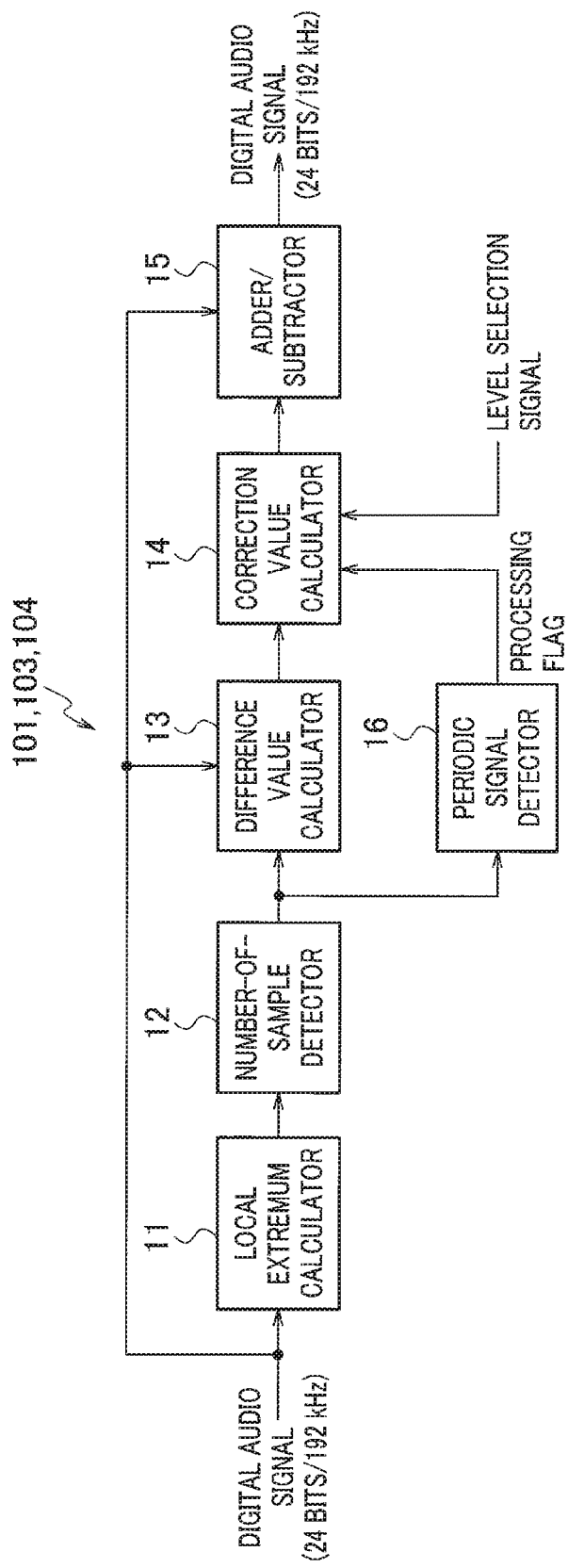
FIG. 1 is a block diagram illustrating a digital audio processing device according to first, third, and fourth embodiments.

A digital audio processing device 101 according to a first embodiment illustrated in FIG. 1 includes a local extremum calculator 11, a number-of-sample detector 12, a difference value calculator 13, a correction value calculator 14, an adder/subtractor 15, and a periodic signal detector 16. The digital audio processing device 101 may be hardware-based, software-based, or a combination thereof.

The local extremum calculator 11 to periodic signal detector 16 may be individually composed of circuits or may be integrally composed of an integrated circuit.

The local extremum calculator 11 and difference value calculator 13 receive a digital audio signal with a number of quantization bits of 24 bits and a sampling frequency of 192 kHz as an example. The local extremum calculator 11 determines the relationship in magnitude between adjacent samples of the inputted digital audio signal to calculate a local maximum and a local minimum. The local extremum calculator 11 calculates the local maximum and the local minimum to detect a local maximum sample having the local maximum and a local minimum sample having the local minimum.

Figure 2:
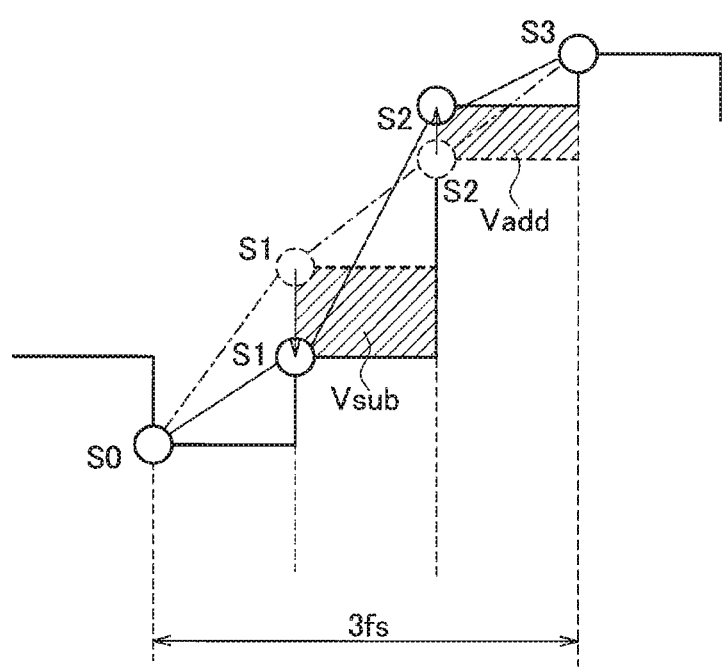
FIG. 2 is a waveform diagram illustrating an example of addition and subtraction of correction values for samples in the vicinity of a local maximum sample and a local minimum sample by the digital audio processing device according to each embodiment.

When the inputted digital audio signal has a waveform illustrated in FIG. 2, the local extremum calculator 11 detects sample S0 as the local minimum sample and sample S3 as the local maximum sample.

The number-of-sample detector 12 detects the number of samples between the local maximum sample and local minimum sample (corresponding to a sample interval). The sample interval between the local maximum sample and the local minimum sample includes: a sample interval of a part in which the sample value increases from the local minimum to the local maximum as illustrated in FIG. 2; and a sample interval of part in which the sample value decreases from the local maximum to the local minimum. The sample interval between the local maximum and the local minimum samples detected by the number-of-sample detector 12 is supplied to the difference value calculator 13 and the periodic signal detector 16.

The difference value calculator 13 calculates the difference in value between adjacent samples in the inputted digital audio signal. The difference value calculated for each sample by the difference value calculator 13 is supplied to the correction value calculator 14.

The correction value calculator 14 calculates a correction value by multiplying a difference value between the local maximum sample and a first adjacent sample that is adjacent to the local maximum sample by a predetermined coefficient. The correction value calculator 14 calculates a correction value by multiplying a difference value between the local minimum sample and a second adjacent sample that is adjacent to the local minimum sample by a predetermined coefficient. The predetermined coefficients are equal to or less than 1.

The correction value calculator 14 may calculate a correction value by multiplying a difference value between the first adjacent sample and a third adjacent sample that is adjacent to the first adjacent sample by a predetermined coefficient. The correction value calculator 14 may calculate a correction value by multiplying a difference value between the second adjacent sample and a fourth adjacent sample that is adjacent to the second adjacent sample by a predetermined coefficient.

The correction value calculator 14 includes coefficients in association with the sample interval. The correction value calculator 14 selects one of the coefficients depending on the sample interval detected by the number-of-sample detector 12. The correction value is preferably adjustable in such a manner that a level selection signal is inputted to the correction value calculator 14 and the coefficient by which the difference value is to be multiplied is selected depending on the inputted level selection signal.

FIG. 3 illustrates correction value examples calculated according to the sample interval and level selection signal. As illustrated in FIG. 3, the correction value calculator 14 includes coefficients of 1/2 to 1/128 corresponding to sample interval values of two to eight samples for level selection signals of "00", "01", "10", and "11", for example.

The adjacent samples in FIG. 3 include: the first adjacent samples adjacent to the local maximum sample; the second adjacent samples adjacent to the local minimum sample; the third adjacent samples adjacent to the first adjacent samples; and the fourth adjacent samples adjacent to the second adjacent samples.

The adder/subtractor 15 adds a correction value to a sample in the vicinity of the local maximum sample and subtracts a correction value from a sample in the vicinity of the local minimum sample. Specifically, the adder/subtractor 15 preferably adds or subtracts a correction value from a sample in the vicinity of the local maximum sample in the following manner.

When the sample interval is two to five samples, the adder/subtractor 15 adds to a sample which precedes the local maximum sample, a correction value obtained by multiplying the difference value between the local maximum sample and the preceding sample by the coefficient. The adder/subtractor 15 simultaneously adds to a sample which follows the local maximum sample, a correction value obtained by multiplying the difference value between the local maximum sample and the following sample by the coefficient. The samples preceding or following the local maximum sample are included in the aforementioned first adjacent samples.

The adder/subtractor 15 subtracts from a sample which precedes the local minimum sample, a correction value obtained by multiplying the difference value between the local minimum sample and the preceding sample by the coefficient. The adder/subtractor 15 simultaneously subtracts from a sample which follows the local minimum sample, a correction value obtained by multiplying the difference value between the local minimum sample and the following sample by the coefficient. The samples preceding or following the local minimum sample are included in the aforementioned second adjacent samples.

When the sample interval is equal to or greater than six samples, the adder/subtractor 15 performs the addition and subtraction process as follows. The adder/subtractor 15 adds to a sample which precedes the local maximum sample, a correction value obtained by multiplying the difference value between the local maximum sample and the preceding sample by the coefficient and adds to a sample which precedes the local maximum sample by two samples, a correction value obtained by multiplying the difference value between the preceding sample and the sample preceding the local maximum sample by two samples, by the coefficient. The adder/subtractor 15 simultaneously adds to a sample which follows the local maximum sample, a correction value obtained by multiplying the difference value between the local maximum sample and the following sample by the coefficient and adds to a sample which follows the local maximum sample by two samples, a correction value obtained by multiplying the difference value, between the following sample and the sample following the local maximum sample by two samples, by the coefficient.

The adder/subtractor 15 subtracts from a sample which precedes the local minimum sample, a correction value obtained by multiplying the difference value between the local minimum sample and the preceding sample by the coefficient, and subtracts, from a sample which precedes the local minimum sample by two samples, a correction value obtained by multiplying the difference value between the preceding sample and the sample preceding the local minimum sample by two samples by the coefficient. The adder/subtractor 15 simultaneously subtracts from a sample which follows the local minimum sample, a correction value obtained by multiplying the difference value between the local minimum sample and the following sample by the coefficient, and subtracts from a sample, which follows the local minimum sample by two samples, a correction value obtained by multiplying the difference value between the following sample and the sample following the local minimum sample by two samples by the coefficient.

The samples preceding or following the local maximum sample by two samples are included in the aforementioned third adjacent samples. The samples preceding or following the local minimum sample by two samples are included in the aforementioned fourth adjacent samples.

Even when the sample interval is equal to or greater than six samples, the adder/subtractor 15 may be configured to add correction values to only the first adjacent samples and subtract correction values from only the second adjacent samples in a similar manner to the case where the sample interval is two to five samples. In addition to the above process, the adder/subtractor 15 may be configured to add a correction value to the local maximum sample and subtracts a correction value from the local minimum sample.

In the example illustrated in FIG. 2, the sample interval between the local minimum sample S0 and local maximum sample S3 is three samples. Herein, when the sample interval between the local maximum sample and the local minimum sample is three samples, the sample interval is represented as 3 fs, where fs is the interval between adjacent samples. Similarly, the sample interval is represented as 4 fs when the sample interval is four samples. Herein, only correction for the waveform between the samples S0 and S3 is described. In the example illustrated in FIG. 2, the sample interval is 3 fs. When the level selection signal is "00", the adder/subtractor 15 adds to sample S2, which precedes the local maximum sample S3, a correction value Vadd which is obtained by multiplying the difference value between the sample S2 and the local maximum sample S3 by a coefficient of 1/2.

The adder/subtractor 15 subtracts from sample S1, which follows the local minimum sample S0, a correction value Vsub which is obtained by multiplying the difference value between the local minimum sample S0 and the sample S1 by a coefficient of 1/2.

The sample S1 at the position indicated by a dashed line is corrected to the position indicated by a solid line by the subtraction of the correction value Vsub. The sample S2 at the position indicated by a dashed line is corrected to the position indicated by a solid line by the addition of the correction value Vadd. The waveform represented by a one-dash chain line is corrected to the waveform represented by a thin solid line.

When the sample interval between the local maximum sample and the local minimum sample is 2 fs, intermediate samples between the local maximum sample and the local minimum sample is subjected to both addition and subtraction. In order to avoid such processing, the adder/subtractor 15 is preferably configured to only perform addition for intermediate samples when the sample interval is 2 fs.

Returning to FIG. 1, the periodic signal detector 16 detects whether the inputted digital audio signal is a periodic signal of a single sine wave by a method described later. The periodic signal detector 16 supplies to the correction value calculator 14, a processing flag representing whether the inputted digital audio signal is a periodic signal of a single sine wave.

When detecting that the inputted digital audio signal is not a periodic signal of a single sine wave, the periodic signal detector 16 supplies to the correction value calculator 14, a processing flag of "on" to execute the aforementioned process of multiplying the difference value by the coefficient. When the processing flag is "on", the correction value calculator 14 calculates and outputs correction values. The adder/subtractor 15 executes the addition and subtraction process to add the correction values to samples in the vicinity of the local maximum sample and subtract the correction values from samples in the vicinity of the local minimum sample. The adder/subtractor 15 then outputs a digital audio signal corrected to improve in sound quality with a number of quantization bits of 24 bits and a sampling frequency of 192 kHz.

When detecting that the inputted digital audio signal is a periodic signal of a single sine wave, the periodic signal detector 16 supplies to the correction value calculator 14, a processing flag of "off" to control the correction value calculator 14 and forcibly set 0 as the coefficients by which the difference values are to be multiplied. When the processing flag is "off", the correction values calculated by the correction value calculator 14 are 0, so that the addition and subtraction process for samples in the vicinity of the local maximum sample and the local minimum sample is not executed. The adder/subtractor 15 then outputs the inputted digital audio signal directly. Even when the digital audio processing device 101 processes the digital audio signal of a single sine wave, therefore, the sound quality thereof is not degraded.

Figure 4:
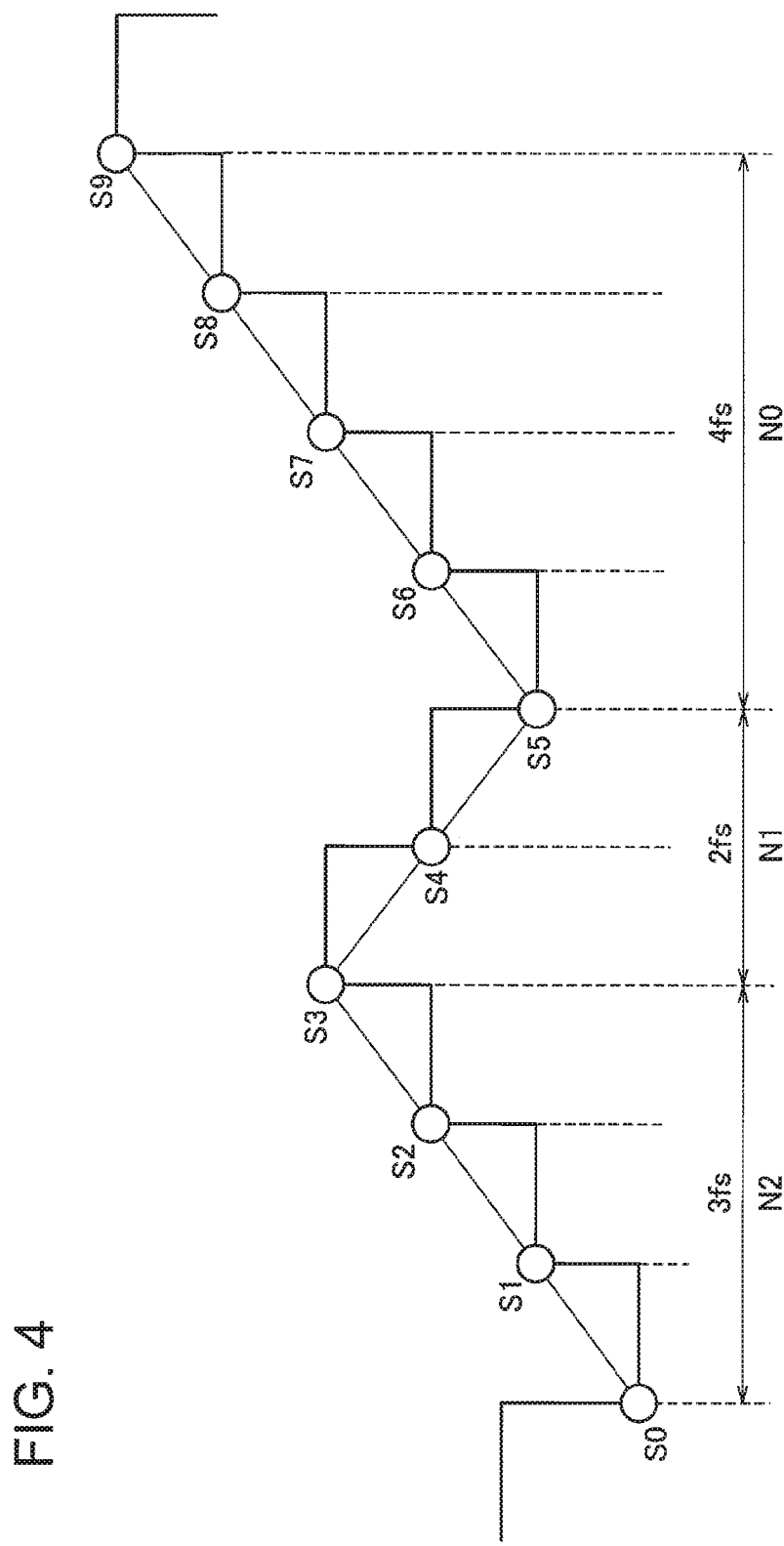
FIG. 4 is a waveform diagram illustrating variables of sample intervals with which a periodic signal detector of the digital audio processing device according to first and second embodiments detects whether the inputted signal is a periodic signal.
Figure 5:
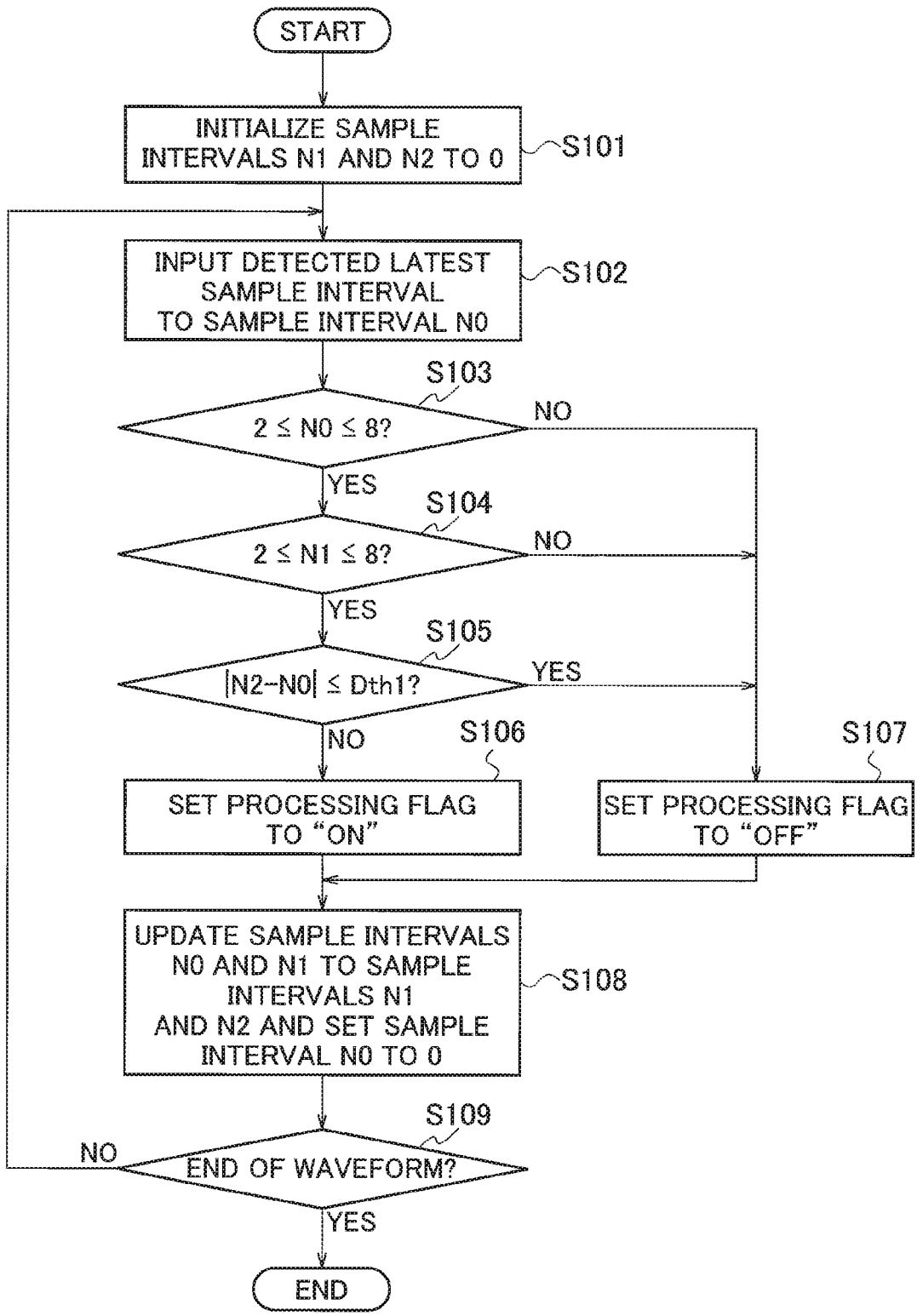
FIG. 5 is a flowchart illustrating a periodic signal detection process by the periodic signal detector of the digital audio processing device according to first and second embodiments.

Herein, the periodic signal detection process executed by the periodic signal detector 16 is described using the flowchart illustrated in FIG. 5 with reference to the waveform illustrated in FIG. 4 as an example. In the waveform illustrated in FIG. 4, samples S0 and S5 are local minimum samples, and samples S3 and S9 are local maximum samples. The sample interval between the local minimum sample S0 and the local maximum sample S3 is 3 fs; the sample interval between the local maximum sample S3 and the local minimum sample S5 is 2 fs; and the sample interval between the local minimum sample S5 and the local maximum sample S9 is 4 fs.

The periodic signal detector 16 holds as variables, a latest sample interval N0 between the local maximum sample and the local minimum sample; a preceding sample interval N1; and a further preceding sample interval N2 (a sample interval which precedes the latest sample interval N0 by two sample intervals).

In FIG. 5, starting the process, the periodic signal detector 16 initializes the sample intervals N1 and N2 as the variables to 0 in step S101. In step S102, the periodic signal detector 16 inputs the latest sample interval detected by the number-of-sample detector 12 to the sample interval N0 as the variable.

As illustrated in FIG. 3, in a first embodiment, addition and subtraction of correction values are performed for waveforms with sample intervals of equal to or greater than 2 fs and equal to or less than 8 fs. In step S103, the periodic signal detector 16 determines whether the sample interval N0 is equal to or greater than 2 and equal to or less than 8. The minimum and maximum values of the sample intervals are not limited to 2 and 8, respectively, and may be properly determined.

When in step S103, the sample interval N0 is not equal to or greater than 2 and equal to or less than 8 (No), the periodic signal detector 16 sets the processing flag to "off" in step S107, and proceeds the process to step S108.

When the sample interval N0 is equal to or greater than 2 and equal to or less than 8 in step S103 (Yes), the periodic signal detector 16 determines in step S104 whether the sample interval N1 is equal to or greater than 2 and equal to or less than 8. When the sample interval N1 is not equal to or greater than 2 and equal to or less than 8 in step S104 (No), the periodic signal detector 16 sets the processing flag to "off" in step S107, and proceeds the process to step S108.

When the sample interval N1 is equal to or greater than 2 and equal to or less than 8 in step S104 (Yes), the periodic signal detector 16 determines in step S105 whether the absolute value of the difference between the sample intervals N2 and N0 is equal to or less than a threshold Dth1. When the absolute value of the difference is equal to or less than the threshold Dth1 (Yes), the digital audio signal is determined to be a periodic signal of a single sine wave. The periodic signal detector 16 then sets the processing flag to "off" in step S107 and proceeds the process to step S108.

When the absolute value of the difference is not equal to or less than the threshold Dth1 (No), the digital audio signal is determined to be not a periodic signal of a single sine wave. The periodic signal detector 16 then sets the processing flag to "on" in step S106 and proceeds the process to step S108.

In digital audio signals, some of the true local maximum value and the true local minimum value correspond to sampling points, but some do not correspond to sampling points. The determination whether the digital audio signal is a periodic signal of a single sine wave therefore requires a predetermined allowance. The threshold Dth1 is the allowance to determine whether the digital audio signal is a periodic signal of a single sine wave, which is set to 2, for example.

In a first embodiment, as described above, the periodic signal detector 16 detects whether the digital audio signal is a periodic signal of a single sine wave based on a first difference between the latest sample interval N0 detected by the number-of-sample detector 12 and the sample interval N2, which precedes the latest sample interval N0 by two sample intervals.

In step S108, the periodic signal detector 16 updates the variables, from the sample intervals N0 and N1 to the sample intervals N1 and N2, and sets the sample interval N0 to 0. In step S109, the periodic signal detector 16 determines whether the process reaches the end of the waveform. When the process does not reach the end of the waveform (No), the periodic signal detector 16 returns the process to step S102 and repeats the steps S102 to S109. When the process reaches the end of the waveform, the periodic signal detector 16 terminates the process.

In a first embodiment, whether the inputted waveform is a waveform with sample intervals of equal to or greater than 2 fs and equal to or less than 8 fs, which is to be subjected to addition and subtraction of correction values, is determined by using both the latest sample interval N0 and the sample interval N1 preceding the same in steps S103 and S104. This prevents erroneous processing, such as execution of the addition and subtraction of correction values even when one of the latest sample interval N0 and the preceding sample interval N1 accidentally represents a waveform with a sample interval of equal to or greater than 2 fs and equal to or less than 8 fs.

In accordance with the digital audio processing device 101 according to a first embodiment and the digital audio processing method according to a first embodiment, it is possible to improve the sound quality of the digital audio signal of other than single sine waves without degrading the sound quality of the digital audio signal of a single sine wave.

Second Embodiment

Figure 6:
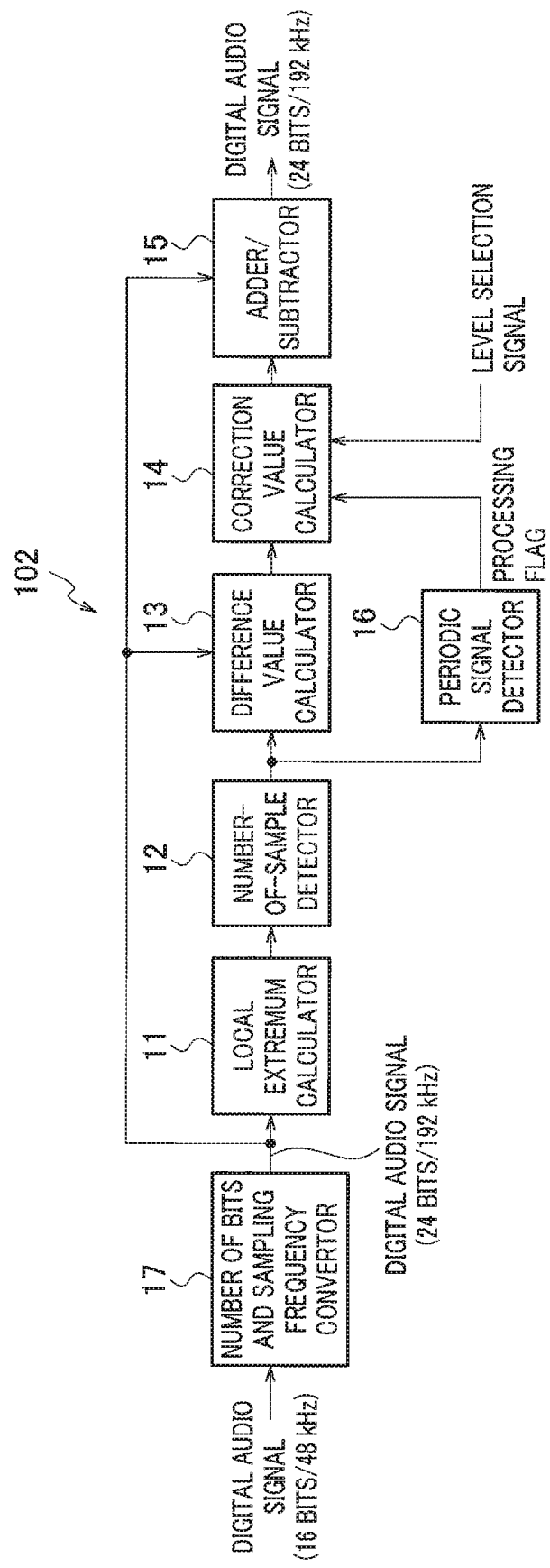
FIG. 6 is a block diagram illustrating the digital audio processing device according to a second embodiment.

In a digital audio processing device 102 according to a second embodiment illustrated in FIG. 6, the same portions as those of the digital audio processing device 101 according to a first embodiment illustrated in FIG. 1 are given the same reference numerals, and the description thereof is omitted. The digital audio processing device 102 according to a second embodiment includes a number of bits and sampling frequency convertor 17 at the input phase.

The number of bits and sampling frequency convertor 17 performs number of bits conversion and sampling frequency conversion for a digital audio signal with a number of quantization bits of 16 bits and a sampling frequency of 48 kHz to output a digital audio signal with a number of quantization bits of 24 bits and a sampling frequency of 192 kHz. The digital audio signal with a number of quantization bits of 24 bits and a sampling frequency of 192 kHz, which is outputted from the number of bits and sampling frequency convertor 17, is processed in the digital audio processing device 102 in the same manner as in the digital audio processing device 101.

In accordance with the digital audio processing device 102 according to a second embodiment and the digital audio processing method according to a second embodiment, even when the inputted digital audio signal is an audio signal of compact discs (CDs) or the like, it is possible to output a digital audio signal with a number of quantization bits of 24 bits and a sampling frequency of 192 kHz with the sound quality improved.

Third Embodiment

A digital audio processing device 103 according to a third embodiment includes the same configuration as that of the digital audio processing device 101 according to a first embodiment illustrated in FIG. 1. The operation of the periodic signal detector 16 of the digital audio processing device 103 is described using a flowchart illustrated in FIG. 8 with reference to the waveform illustrated in FIG. 7 as an example.

Figure 7:
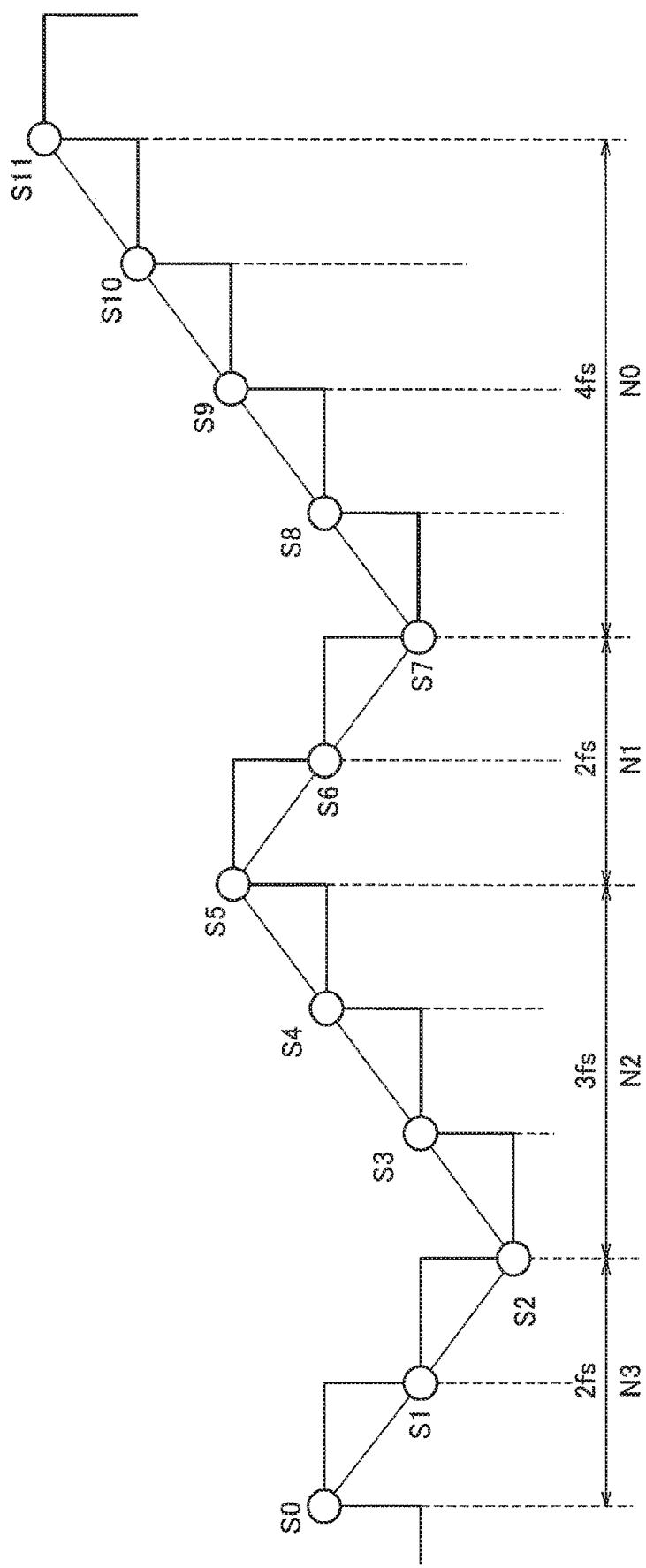
FIG. 7 is a waveform diagram illustrating variables of sample intervals with which a periodic signal detector of the digital audio processing device according to third and fourth embodiments detects whether the inputted signal is a periodic signal.

In the waveform illustrated in FIG. 7, samples S0, S5, and S11 are local maximum samples, and samples S2 and S7 are local minimum samples. The sample interval between the local maximum sample S0 and the local minimum sample S2 is 2 fs; the sample interval between the local minimum sample S2 and the local maximum sample S5 is 3 fs; the sample interval between the local maximum sample S5 and the local minimum sample S7 is 3 fs; and the sample interval between the local minimum sample S7 and the local maximum sample S11 is 4 fs.

The periodic signal detector 16 holds as variables, a latest sample interval N0 between the local maximum sample and the local minimum sample; a preceding sample interval N1; a further preceding sample interval N2 (a sample interval which precedes the latest sample interval N0 by two sample intervals); and a still further preceding sample interval N3 (a sample interval which precedes the latest sample interval N0 by three sample intervals).

Figure 8:
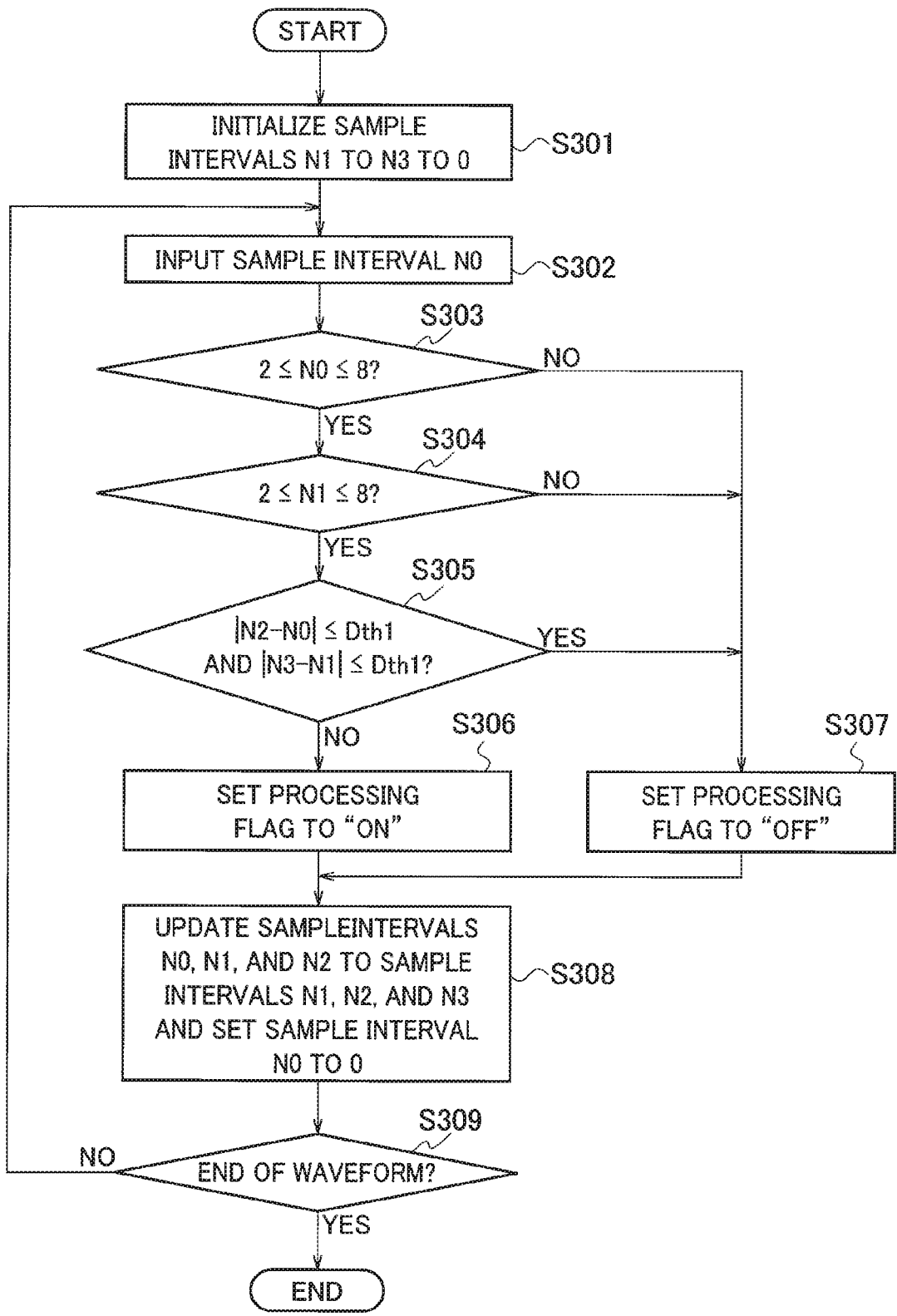
FIG. 8 is a flowchart illustrating the periodic signal detection process by the periodic signal detector of the digital audio processing device according to a third embodiment.

In FIG. 8, starting the process, the periodic signal detector 16 initializes the sample intervals N1 to N3 as the variables to 0 in step S301. In step S302, the periodic signal detector 16 inputs the latest sample interval detected by the number-of-sample detector 12 to the sample interval N0 as the variable.

In step S303, the periodic signal detector 16 determines whether the sample interval N0 is equal to or greater than 2 and equal to or less than 8. When the sample interval N0 is not equal to or greater than 2 and equal to or less than 8 in step S303 (No), the periodic signal detector 16 sets the processing flag to "off" in step S307, and proceeds the process to step S308.

When the sample interval N0 is equal to or greater than 2 and equal to or less than 8 in step S303 (Yes), the periodic signal detector 16 determines in step S304 whether the sample interval N1 is equal to or greater than 2 and equal to or less than 8. When the sample interval N1 is not equal to or greater than 2 and equal to or less than 8 in step S304 (No), the periodic signal detector 16 sets the processing flag to "off" in step S307, and proceeds the process to step S308.

When the sample interval N1 is equal to or greater than 2 and equal to or less than 8 in step S304 (Yes), the periodic signal detector 16 determines in step S305 whether the absolute value of the difference between the sample intervals N2 and N0 is equal to or less than a threshold Dth1 and the absolute value of the difference between the sample intervals N3 and N1 is equal to or less than the threshold Dth1.

When this condition is satisfied in step S305 (Yes), the digital audio signal is determined to be a periodic signal of a single sine wave. The periodic signal detector 16 then sets the processing flag to "off" in step S307 and proceeds the process to step S308. When this condition is not satisfied in step S305 (No), the digital audio signal is determined to be not a periodic signal of a single sine wave. The periodic signal detector 16 then sets the processing flag to "on" in step S306, and proceeds the process to step S308.

In a third embodiment, thus, whether the digital audio signal is a periodic signal of a single sine wave is determined based on the above-described first difference and a second difference between the sample interval N1, which precedes the latest sample interval N0, and the sample interval N3, which precedes the latest sample interval N3 by three sample intervals.

In step S308, the periodic signal detector 16 updates the variables, from the sample intervals N0 to N2 to the sample intervals N1 and N3, and sets the sample interval N0 to 0. In step S309, the periodic signal detector 16 determines whether the process reaches the end of the waveform. When the process does not reach the end of the waveform (No), the periodic signal detector 16 returns the process to step S302 and repeats the steps S302 to S309. When the process reaches the end of the waveform (Yes), the periodic signal detector 16 terminates the process.

In accordance with the digital audio processing device 103 according to a third embodiment, whether the inputted digital audio signal is a periodic signal of a single sine wave is determined using both of the absolute value of the difference between the sample intervals N2 and N0 and the absolute value of the difference between the sample intervals N3 and N1. This provides a higher degree of determination accuracy than the digital audio processing device 101 according to a first embodiment.

In accordance with the digital audio processing device 103 and the digital audio processing method according to a third embodiment, it is possible to determine whether the digital audio signal is a periodic signal of a single sine wave at a high degree of accuracy and improve the sound quality of the digital audio signal of other than single sine waves without degrading the sound quality of the digital audio signal of a single sine wave.

The digital audio processing device according to a third embodiment may employ the same configuration as the digital audio processing device 102 according to a second embodiment illustrated in FIG. 6.

Fourth Embodiment

A digital audio processing device 104 according to a fourth embodiment includes the same configuration as that of the digital audio processing device 101 according to a first embodiment illustrated in FIG. 1. The operation of the periodic signal detector 16 of the digital audio processing device 104 is described using a flowchart illustrated in FIG. 9 with reference to the waveform illustrated in FIG. 7 as an example.

In a similar manner to the digital audio processing device 103 according to a third embodiment, the periodic signal detector 16 of the digital audio processing device 104 holds as variables, a latest sample interval N0 between the local maximum sample and the local minimum sample; a preceding sample interval N1; a further preceding sample interval N2 (a sample interval which precedes the latest sample interval N0 by two sample intervals); and a still further preceding sample interval N3 (a sample interval which precedes the latest sample interval N0 by three sample intervals).

Figure 9:
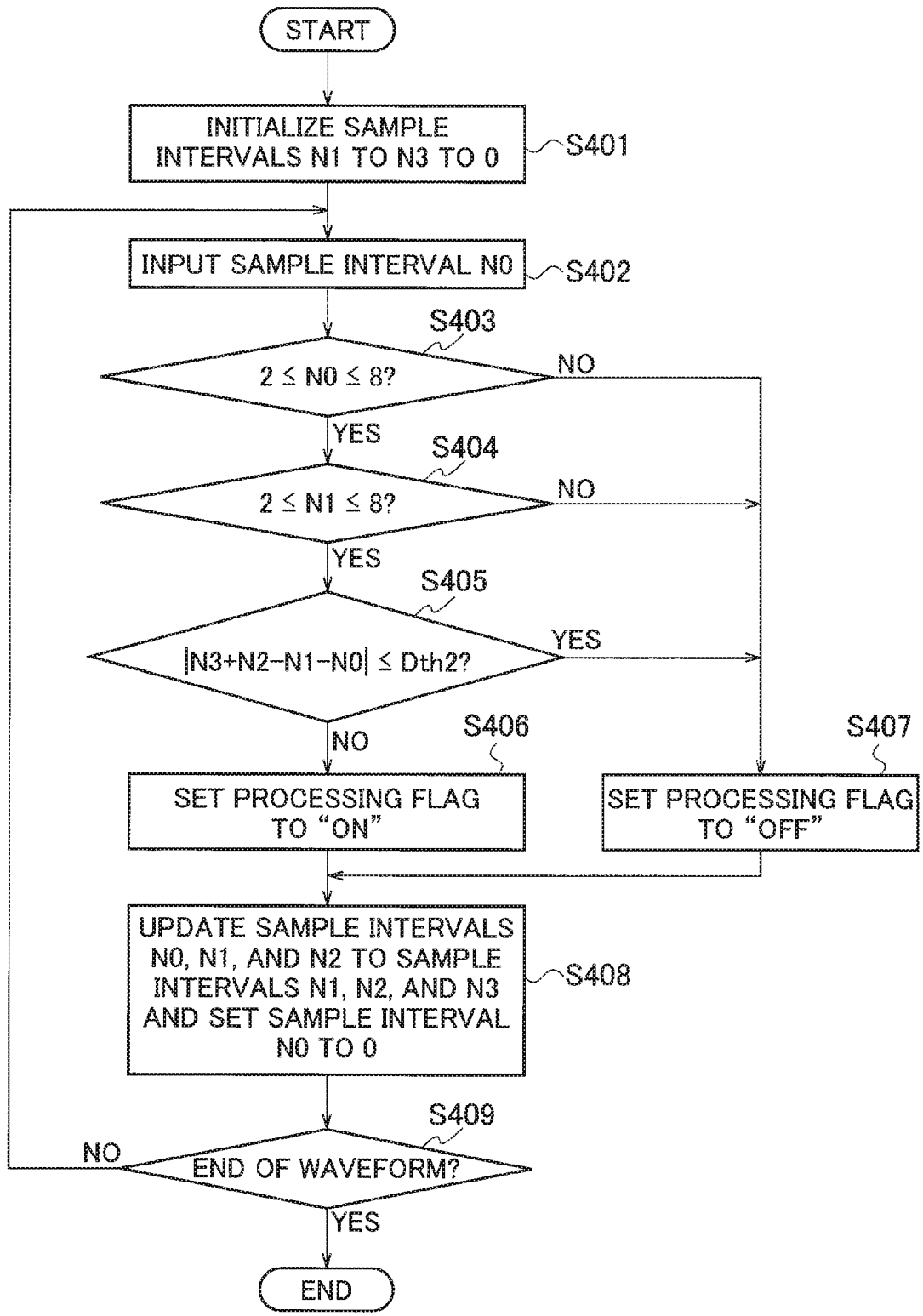
FIG. 9 is a flowchart illustrating the periodic signal detection process by the periodic signal detector of the digital audio processing device according to a fourth embodiment.

The periodic signal detector 16 executes the same processing in steps S401 to S404 and S406 to S409 illustrated in FIG. 9 as that in steps S301 to S304 and S306 to S309 illustrated in FIG. 8. The periodic signal detector 16 of the digital audio processing device 104 executes step S405 in FIG. 9 instead of step S305 in FIG. 8.

In step S405, the periodic signal detector 16 determines whether the absolute value of a value obtained by subtracting the sample intervals N1 and N0 from the sum of the sample intervals N3 and N2 is equal to or less than a threshold Dth2. The periodic signal detector 16 thus compares one period of the digital audio signal composed of the latest sample interval N0 and sample interval N1 against one previous period composed of the sample intervals N2 and N3, to determine whether the digital audio signal is a periodic signal of a single sine wave.

The threshold Dth2 herein preferably is set to the sum of the two thresholds Dth1 in the step S305 in FIG. 8.

The processing in the step S405 substantially corresponds to the combination of processing in step S305 in FIG. 8, including: determination whether the absolute value of the difference between the sample intervals N2 and N0 is equal to or less than the threshold Dth1; and determination whether the absolute value of the difference between the sample intervals N3 and N1 is equal to or less than the threshold Dth1. This means that whether the digital audio signal is a periodic signal of a single sine wave is detected based on the above-described first difference and the above-described second difference also in a fourth embodiment.

In accordance with the digital audio processing device 104 according to a fourth embodiment, whether the inputted digital audio signal is a periodic signal of a single sine wave is determined using the sample intervals N0 to N3. This provides a higher degree of determination accuracy than the digital audio processing device 101 of a first embodiment.

In accordance with the digital audio processing device 104 according to a fourth embodiment and the digital audio processing method according to a fourth embodiment, it is possible to determine whether the digital audio signal is a periodic signal of a single sine wave at a high degree of accuracy and improve the sound quality of the digital audio signal of other than single sine waves without degrading the sound quality of the digital audio signal of a single sine wave.

The digital audio processing device according to a fourth embodiment may employ the same configuration as the digital audio processing device 102 according to a second embodiment illustrated in FIG. 6.

(Digital Audio Processing Program According to First to Fourth Embodiments)

Digital audio processing programs may be configured to cause a computer to execute the above-described operations of the digital audio processing devices 101 to 104 according to first to fourth embodiments and the processes by the digital audio processing methods according to first to fourth embodiments.

Figure 10:
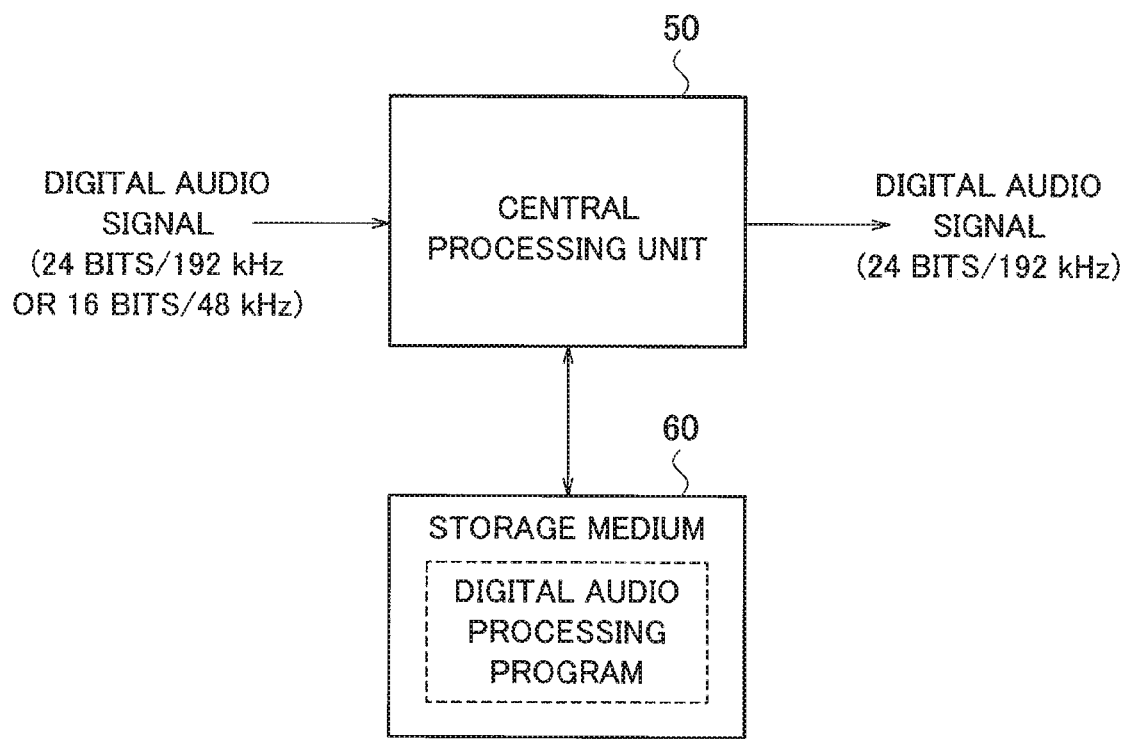
FIG. 10 is a block diagram illustrating a configuration example of a microcomputer that executes a digital audio processing program according to each embodiment.

As illustrated in FIG. 10, a central processing unit (CPU) 50 of a microcomputer connects to a storage medium 60. The storage medium 60 may be a storage medium provided for the microcomputer. The storage medium 60 is any non-transitory storage medium, such as a hard disk drive, an optical disc, or a semiconductor memory. The storage medium 60 stores the digital audio processing program. The digital audio processing program may be transmitted from an external server through a communication line, such as the Internet, to be stored in the storage medium 60.

By the CPU 50 executing the digital audio processing programs, the microcomputer serves as the digital audio processing devices 101 to 104 according to first to fourth embodiments and executes the digital audio processing methods according to first to fourth embodiments.

Figure 11:
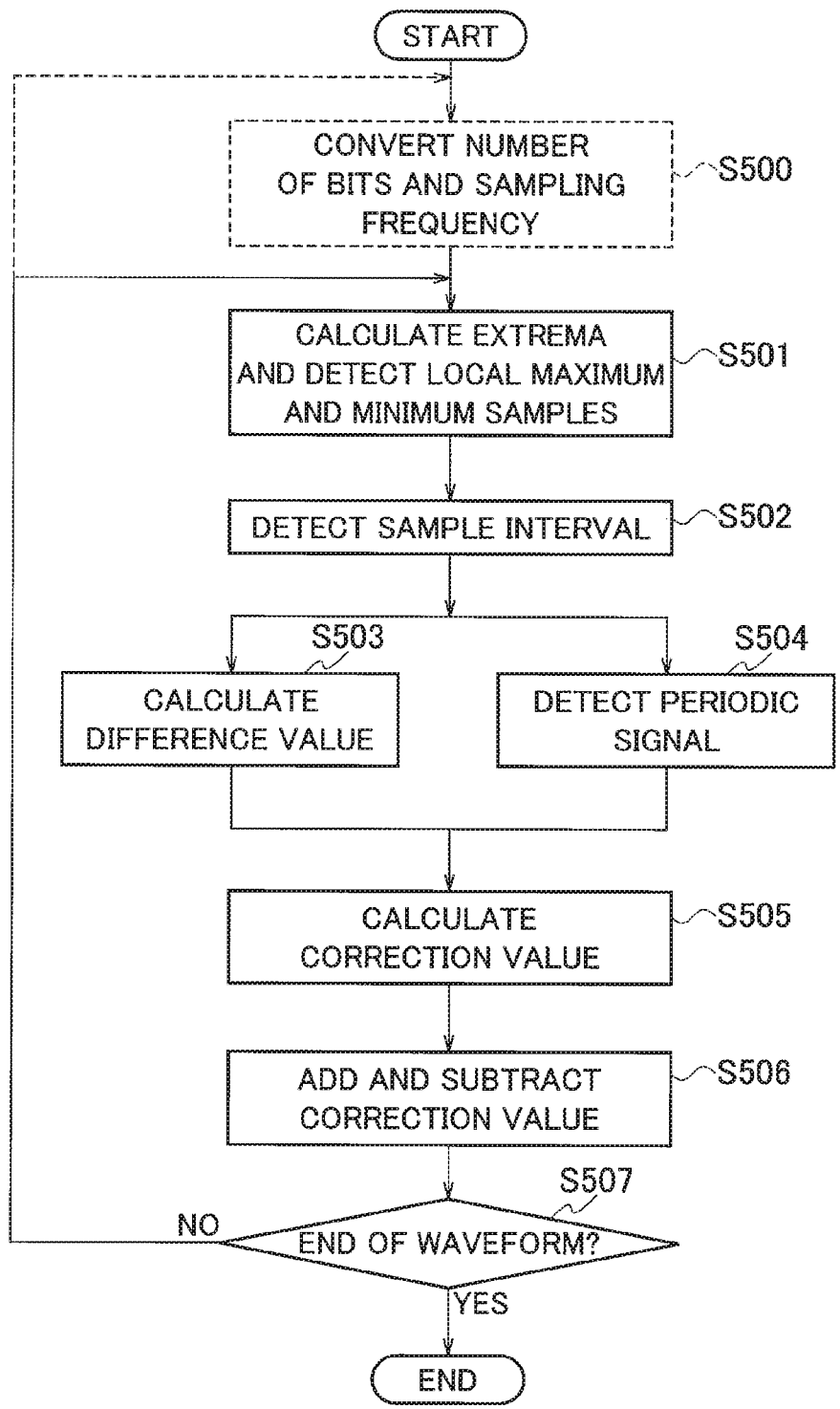
FIG. 11 is a flowchart illustrating a process that the digital audio processing program according to each embodiment causes the microcomputer to execute.

Using a flowchart illustrated in FIG. 11, the process that each digital audio processing program causes the CPU 50 to execute is described. When the inputted digital audio signal has a number of quantization bits of 16 bits and a sampling frequency of 48 kHz, the CPU 50 converts the inputted digital audio signal to a digital audio signal with a number of quantization bits of 24 bits and a sampling frequency of 192 kHz in step S500. When the inputted digital audio signal is a digital audio signal with a number of quantization bits of 24 bits and a sampling frequency of 192 kHz, step S500 is omitted.

In step S501, the CPU 50 calculates the local maximum and local minimum and detects the local maximum sample and the local minimum sample. In step S502, the CPU 50 detects the sample interval between the local maximum sample and the local minimum sample. In step S503, the CPU 50 calculates difference values between adjacent samples in the digital audio signal. The CPU 50 detects in step S504 whether the digital audio signal is a periodic signal of a single sine wave in parallel to step S503.

The CPU 50 executes the periodic signal detection process illustrated in any one of FIGS. 5, 8, and 9 in accordance with the digital audio processing program in step S504.

When it is detected in step S502 that the sample interval is within the range from a predetermined minimum value (2 fs, for example) to a predetermined maximum value (8 fs, for example) and it is detected in step S504 that the digital audio signal is not a periodic signal of a single sine wave, the CPU 50 calculates correction values in step S505. Specifically, the CPU 50 calculates a first correction value by multiplying the difference value between the local maximum sample and a first adjacent sample, which is adjacent to the local maximum sample, by a predetermined coefficient and calculates a second correction value by multiplying the difference value between the local minimum sample and a second adjacent sample, which is adjacent to the local minimum sample, by a predetermined coefficient.

In step S506, the CPU 50 adds the first correction value to the first adjacent sample and subtracts the second correction value from the second adjacent sample to correct the digital audio signal and output the corrected digital audio signal.

As previously described, in between the local maximum sample and the local minimum sample adjacent to each other, the coefficients used to calculate the first and second correction values are the same coefficient selected based on the sample interval (and the level selection signal).

On the other hand, when it is detected in step S504 that the digital audio signal is a periodic signal of a single sine wave, the CPU 50 sets to 0, the coefficient by which the difference value between the local maximum sample and first adjacent sample is to be multiplied and the coefficient by which the difference value between the minimum sample and the second adjacent sample is to be multiplied. The CPU 50 thus sets the first and second correction values to 0 in step S505.

The CPU 50 therefore does not add the correction value to the first adjacent sample and does not subtract the correction value from the second adjacent sample in step S506. The CPU 50 thereby outputs the digital audio signal without correcting the same.

When it is detected in step S502 that the sample interval is not within the aforementioned range, the CPU 50 does not calculate the correction values in step S505 and outputs the digital audio signal without correcting the same in step S506.

In step S507, the CPU 50 determines whether the process reaches the end of the waveform. When the process does not reach the end of the waveform (No), the CPU 50 returns the process to step S501 (or step S500) and repeats the steps S501 to S507 (or steps S500 to S507). When the process reaches the end of the waveform (YES), the CPU 50 terminates the process.

The present invention is not limited to first to fourth embodiments described above and can be variously changed without departing from the scope of the invention. In first to fourth embodiments, when the digital audio signal is a periodic signal of a single sine wave, the periodic signal detector 16 supplies a processing flag of "off" to the correction value calculator 14. The correction value calculated by the correction value calculator 14 is thereby set to 0, so that addition and subtraction for samples in the vicinity of the local maximum sample and the local minimum sample is not executed.

The periodic signal detector 16 may be configured to supply a processing flag to the adder/subtractor 15 so as to change whether to perform addition and subtraction of correction values for samples in the vicinity of the local maximum sample and the local minimum sample. In this case, the correction value calculator 14 calculates correction values irrespective of whether the digital audio signal is a periodic signal of a single sine wave. The adder/subtractor 15 performs addition and subtraction of correction values when the processing flag is "on" and does not perform addition and subtraction of correction values when the processing flag is "off".

The digital audio processing devices therefore only need to be configured not to perform addition and subtraction of correction values for samples in the vicinity of a local maximum sample and a local minimum sample when the periodic signal detector 16 detects that the digital audio signal is a periodic signal of a single sine wave.

The digital audio processing methods only need not to perform addition and subtraction of correction values for samples in the vicinity of the local maximum sample and the local minimum sample and output the digital audio signal without correcting the same when detecting that the digital audio signal is a periodic signal of a single sine wave. The digital audio processing programs only need to cause a computer to execute a step of not performing addition and subtraction of correction values for samples in the vicinity of the local maximum sample and the local minimum sample and outputting the digital audio signal without correcting the same when detecting that the digital audio signal is a periodic signal of a single sine wave.

What is claimed is:

1. A digital audio processing device comprising:
a local extremum calculator configured to calculate a local maximum and a local minimum in samples constituting an inputted digital audio signal, and to detect a local maximum sample including the local maximum and a local minimum sample including the local minimum;
a number-of-sample detector configured to detect a sample interval between the local maximum sample and the local minimum sample adjacent to each other;
a difference value calculator configured to calculate difference values between adjacent samples of the digital audio signal;
a correction value calculator configured, when the sample interval detected by the number-of-sample detector is within a range from a predetermined minimum value to a predetermined maximum value, to calculate a first correction value by multiplying the difference value between the local maximum sample and a first adjacent sample, which is adjacent to the local maximum sample, by a predetermined coefficient, and to calculate a second correction value by multiplying the difference value between the local minimum sample and a second adjacent sample, which is adjacent to the local minimum sample, by the predetermined coefficient, the difference values being calculated by the difference value calculator;
an adder/subtractor configured to add the first correction value to the first adjacent sample and to subtract the second correction value from the second adjacent sample; and
a periodic signal detector configured to detect whether the digital audio signal is a periodic signal of a single sine wave, at least based on a first difference between a latest sample interval detected by the number-of-sample detector and a sample interval which precedes the latest sample interval by two sample intervals, wherein the digital audio processing device is configured not to add the first correction value to the first adjacent sample and not to subtract the second correction value from the second adjacent sample when the periodic signal detector detects that the digital audio signal is a periodic signal of a single sine wave.

2. The digital audio processing device according to claim 1, wherein the periodic signal detector detects whether the digital audio signal is a periodic signal of a single sine wave, based on the first difference and a second difference between a sample interval which precedes the latest sample interval and a sample interval which precedes the latest sample interval by three sample intervals.

3. The digital audio processing device according to claim 1, wherein when detecting that the digital audio signal is a periodic signal of a single sine wave, the periodic signal detector controls the correction value calculator and sets the predetermined coefficients to 0, and the adder/subtractor does not add the first correction value to the first adjacent sample and does not subtract the second correction value from the second adjacent sample.

4. A digital audio processing method comprising:

calculating a local maximum and a local minimum in samples constituting an inputted digital audio signal and detecting a local maximum sample including the local maximum and a local minimum sample including the local minimum;

detecting a sample interval between the local maximum sample and the local minimum sample adjacent to each other;

calculating difference values between adjacent samples of the digital audio signal;

detecting whether the digital audio signal is a periodic signal of a single sine wave, at least based on a difference between a latest sample interval and a sample interval which precedes the latest sample interval by two sample intervals;

when it is detected that the digital audio signal is not a periodic signal of a single sine wave and the detected sample interval is within a range from a predetermined minimum value to a predetermined maximum value, calculating a first correction value by multiplying the difference value between the local maximum sample and a first adjacent sample, which is adjacent to the local maximum sample, by a predetermined coefficient and calculating a second correction value by multiplying the difference value between the local minimum sample and a second adjacent sample, which is adjacent to the local minimum sample, by the predetermined coefficient;

adding the first correction value to the first adjacent sample and subtracting the second correction value from the second adjacent sample to correct the digital audio signal and output the corrected digital audio signal; and when it is detected that the digital audio signal is a periodic signal of a single sine wave, outputting the digital audio signal without correcting the digital audio signal by not adding the first correction value to the first adjacent sample and not subtracting the second correction value from the second adjacent sample.

5. A digital audio processing program stored in a non-transitory storage medium causing a computer to execute the steps of:

a step of calculating a local maximum and a local minimum in samples constituting an inputted digital audio signal and detecting a local maximum sample including the local maximum and a local minimum sample including the local minimum;

a step of detecting a sample interval between the local maximum sample and the local minimum sample adjacent to each other;

a step of calculating difference values between adjacent samples of the digital audio signal;

a step of detecting whether the digital audio signal is a periodic signal of a single sine wave, at least based on a difference between a latest sample interval and a sample interval which precedes the latest sample interval by two sample intervals;

when it is detected that the digital audio signal is not a periodic signal of a single sine wave and the detected sample interval is within a range from a predetermined minimum value to a predetermined maximum value, a step of calculating a first correction value by multiplying the difference value between the local maximum sample and a first adjacent sample, which is adjacent to the local maximum sample, by a predetermined coefficient and calculating a second correction value by multiplying the difference value between the local minimum sample and a second adjacent sample, which is adjacent to the local minimum sample, by the predetermined coefficient;

a step of adding the first correction value to the first adjacent sample and subtracting the second correction value from the second adjacent sample to correct the digital audio signal and output the corrected digital audio signal; and when it is detected that the digital audio signal is a periodic signal of a single sine wave, a step of outputting the digital audio signal without correcting the digital audio signal by not adding the first correction value to the first adjacent sample and not subtracting the second correction value from the second adjacent sample.

* * * * *